United States Patent
Nakata et al.

(10) Patent No.: US 7,110,131 B2
(45) Date of Patent: Sep. 19, 2006

(54) IMAGE FORMING SYSTEM AND IMAGE FORMING APPARATUS FOR TRANSFERRING JOB DATA WHEN AN IMPAIRED IMAGE FORMING STATE IS DETECTED

(75) Inventors: Hironobu Nakata, Itami (JP); Takeshi Morikawa, Itami (JP); Tatsuji Hirakawa, Aichi-Ken (JP); Hiroshi Sumiyama, Aichi-Ken (JP); Munetaka Fujita, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 869 days.

(21) Appl. No.: 09/970,027

(22) Filed: Oct. 4, 2001

(65) Prior Publication Data

US 2002/0085850 A1    Jul. 4, 2002

(30) Foreign Application Priority Data

Oct. 10, 2000 (JP) ............................. 2000-309703

(51) Int. Cl.
*G06F 3/12* (2006.01)
*G06K 15/00* (2006.01)
(52) U.S. Cl. .................................... 358/1.15; 358/1.14
(58) Field of Classification Search ........ 358/1.1–1.18, 358/402, 403, 405, 458
See application file for complete search history.

(56) References Cited

U.S. PATENT DOCUMENTS

| | | | | |
|---|---|---|---|---|
| 6,552,813 B1* | 4/2003 | Yacoub | ....................... | 358/1.1 |
| 6,700,678 B1* | 3/2004 | Luman | ....................... | 358/1.15 |
| 6,862,103 B1* | 3/2005 | Miura et al. | ................ | 358/1.15 |
| 2005/0237571 A1* | 10/2005 | Motamed et al. | .......... | 358/1.15 |

FOREIGN PATENT DOCUMENTS

| | | |
|---|---|---|
| JP | 11-110163 | 4/1999 |
| JP | 11-191043 | 7/1999 |
| JP | 11-203078 | 7/1999 |

* cited by examiner

*Primary Examiner*—Douglas Q. Tran
(74) *Attorney, Agent, or Firm*—Morrison & Foerster LLP

(57) ABSTRACT

An image forming system and image forming apparatus capable of suppressing reduced productivity and avoiding the troublesome task of sorting output materials even when image formation becomes impossible. The system and apparatus include a transfer controller that permits job data transfer to another image forming apparatus if image formation of the job data has not started when an impaired image forming state is detected in an image forming apparatus, and that prohibits job data transfer to another image forming apparatus if image formation of job data has already started. In this way, the image formation process can be executed without processing congestion by having another image forming apparatus perform the job data image formation. Moreover, the task of sorting the output material is unnecessary because the job data is not dispersed between the transfer origin and the transfer destination.

18 Claims, 6 Drawing Sheets

IMAGE FORMING SYSTEM AND IMAGE FORMING APPARATUS FOR TRANSFERRING JOB DATA WHEN AN IMPAIRED IMAGE FORMING STATE IS DETECTED

RELATED APPLICATIONS

This application is based on application no. 2000-309703 filed in Japan, the contents of which are hereby incorporated by reference.

FIELD OF THE INVENTION

The present invention relates to an image forming apparatus and an image forming system connecting a plurality of image forming apparatuses such as multifunction printers via a network.

DESCRIPTION OF THE RELATED ART

In an image forming apparatus for handling job data, e.g., a printing device, in conventional image forming systems, when an error is generated such as mismatched paper size information, paper empty condition or the like such that a print operation becomes impaired, the printing device is stopped, and paper replacement or paper re-supply time is required.

In a structure wherein a printing device is stopped when an error is generated as in conventional systems, printing productivity is reduced due to the delay and time during which the printing device printing the received job data is stopped.

Furthermore, since the memory of the print device is exclusively occupied by the job data interrupted by the error, there is concern that subsequent print jobs cannot be loaded into memory and that the printing process cannot be executed. Japanese Laid-Open Patent Nos. H11-314438, H5-313841, and H11-110163 disclose structures wherein job data are transferred to another printer connected to the network to execute a printing process when printing cannot be accomplished due to an error generated in the printer currently executing the job.

In the known art, however, the printed output of an executing job is allocated to both the transfer originating printer and the transfer destination printer. In this case, a user must collect the output from both printers. Particularly when the transfer destination printer is relatively far away, much time and effort is consumed in going to the transfer destination.

These and other drawbacks and disadvantages exist in conventional systems.

SUMMARY OF THE INVENTION

In view of the problems associated with conventional systems, a feature of the present invention is to provide an image forming system and image forming apparatus capable of suppressing reduction in productivity and avoiding the task of sorting output materials even when image formation becomes impaired.

According to one embodiment, the present invention includes an image forming system having a plurality of image forming apparatuses connected to a network and capable of mutually transmitting job data, said image forming system being provided with a transfer controller for permitting the transfer of job data to another image forming apparatus when an image forming apparatus processing job data is detected to be in an impaired image forming state before image formation of the job data has started, and prohibiting transfer of job data to another image forming apparatus after image formation of job data has started insofar as specific conditions are not satisfied.

According to this embodiment, when an impaired image forming state is detected in an image forming apparatus, the transfer controller permits the transfer of job data to another image forming apparatus if image formation of the job data has not yet started, and transfer of the job data to another image forming apparatus is prohibited if image formation of the job data has already started. In this way image formation of job data is executed by another image forming apparatus, and the image formation process is accomplished without processing congestion. Moreover, the task of sorting output material is eliminated because job data are not dispersed between the transfer origin image forming apparatus and the transfer destination image forming apparatus.

This embodiment may be provided with a distance determining portion for determining whether or not another image forming apparatus is located within a fixed distance of a certain image forming apparatus, and the transfer controller may permit transfer of job data to another image forming apparatus when the distance determining portion determines that the other image forming apparatus is located within a fixed distance of a certain image forming apparatus even after image formation of the job data has started.

In this case, even though the job data are dispersed between the transfer origin image forming apparatus and the transfer destination image forming apparatus, the output materials are easily sorted and the load on the user is slight because the transfer destination image forming apparatus is near the transfer origin image forming apparatus.

Furthermore, a specific time determining portion may be provided to determine whether or not an impaired image forming state has continued beyond a specific time after image formation of job data has started, and the transfer controller may permit transfer of job data to another image forming apparatus when the specific time determining portion determines that an impaired image forming state has continued longer than the specific time even after image formation of the job data has started.

In this case, there is concern that sequentially received subsequent job data may overflow in the impaired image forming state and be lost and not recorded.

An output page number determining portion may be provided to determine whether or not the number of output pages by image formation reaches a specific value, and the transfer controller may permit transfer of job data to another image forming apparatus when the output page number determining portion determines that the number of output pages by image formation has not reached a specific value even after image formation of the job data has started, and the transfer destination image forming apparatus may be set to start image formation from the first page of the job data.

In this case, the job of sorting output material is unnecessary because the job data are output from the first page on the transfer destination image forming apparatus although a number of output pages remain to reach the specific value at the transfer origin image forming apparatus.

According to another embodiment, the present invention includes an image forming apparatus capable of transferring job data to another image forming apparatus over a network, provided with a transfer controller for permitting transfer of job data to another image forming apparatus if image formation of job data has not started when an impaired image forming state is detected for the job data, and prohibits transfer of job data to another image forming apparatus after image formation has started insofar as specific conditions are not satisfied.

In this embodiment, the transfer controller permits transfer of job data to another image forming apparatus when an impaired image forming state is detected if image formation of the job data has not started, and prohibits transfer of job data to another image forming apparatus if image formation of job data has already started. For this reason, image formation of job data can be executed by another image forming apparatus so as to execute the image formation process without processing congestion. Moreover, since the job data are not dispersed between the transfer origin image forming apparatus and the transfer destination image forming apparatus, the user is relieved from the complex task of sorting the output materials.

The image forming apparatus may have a distance determining portion, and the transfer controller may permit transfer of job data to another image forming apparatus when the distance determining portion determines that the other image forming apparatus is located within a fixed distance even after image formation of job data has started.

In this case, even though the job data are dispersed between the transfer origin image forming apparatus and the transfer destination image forming apparatus, the output materials are easily sorted and the load on the user is slight because the transfer destination image forming apparatus is near the transfer origin image forming apparatus.

Furthermore, a specific time determining portion may be provided to determine whether or not an impaired image forming state has continued beyond a specific time after image formation of job data has started, and the transfer controller may permit transfer of job data to another image forming apparatus when the specific time determining portion determines that an impaired image forming state has continued longer than the specific time even after image formation of the job data has started.

In this case, there is concern that sequentially received subsequent job data may overflow in the impaired image forming state and be lost and not recorded.

An output page number determining portion may be provided to determine whether or not the number of output pages by image formation reaches a specific value, and the transfer controller may permit transfer of job data to another image forming apparatus when the output page number determining portion determines that the number of output pages by image formation has not reached a specific value even after image formation of the job data has started, and the transfer destination image forming apparatus may be set to start image formation from the first page of the job data.

In this case, the job of sorting output material is unnecessary because the job data are output from the first page on the transfer destination image forming apparatus although a number of output pages remain to reach the specific value at the transfer origin image forming apparatus.

DESCRIPTION OF THE PREFERRED EMBODIMENTS

The embodiments of the present invention are described hereinafter with reference to the accompanying drawings.

Figure 1:
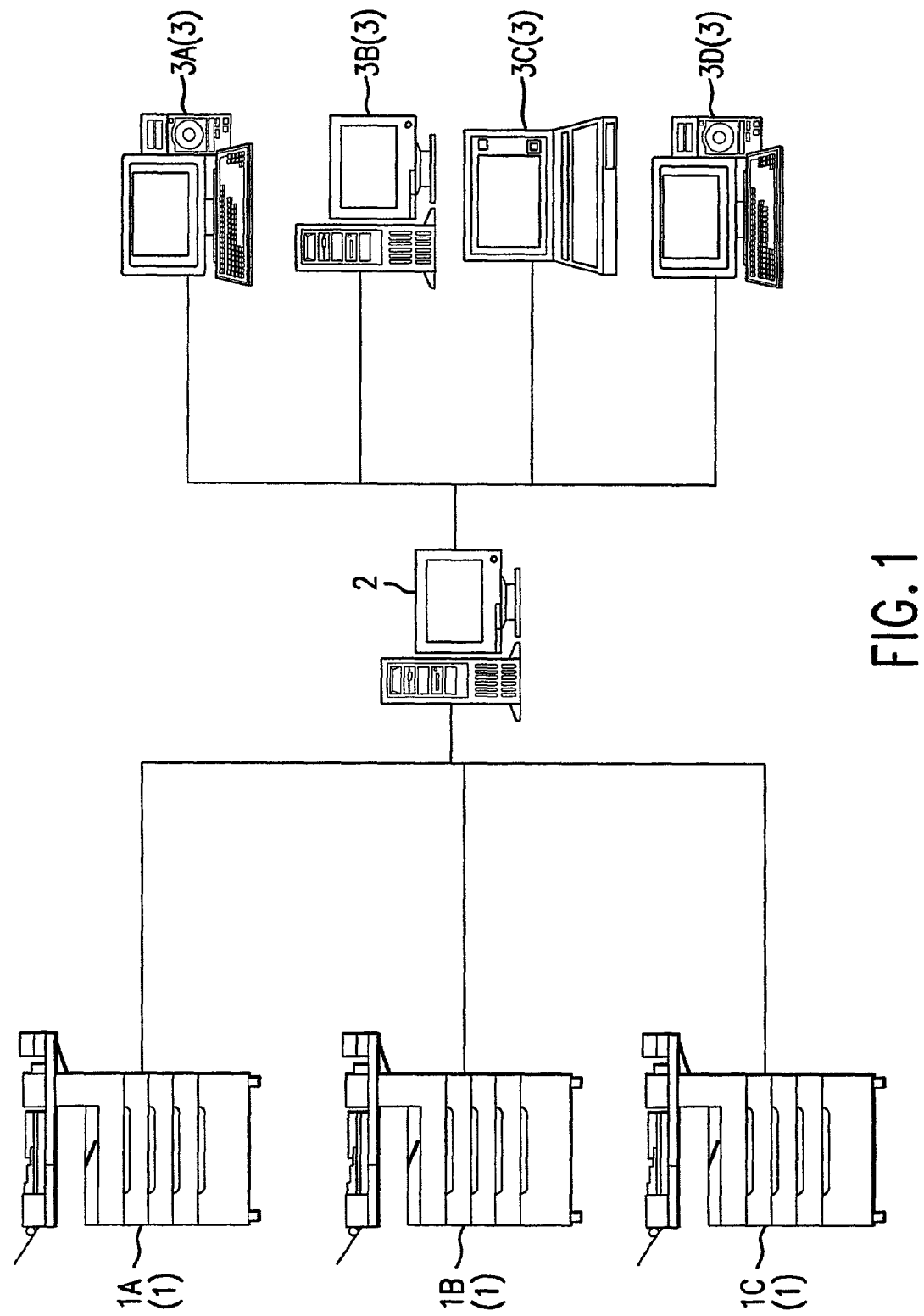
FIG. 1 is a structural view of the image forming system of an embodiment of the present invention.

FIG. 1 is a structural view of an embodiment of the image forming system of the present invention.

In FIG. 1, a plurality of printers 1 (1A, 1B, 1C) capable of mutually transferring image data, and a plurality of client computers (PC) 3 (3A, 3B, 3C, 3D) are connected by a network NW to a server 2 acting as a host computer. The printers 1 are, for example, a multifunction type having a digital copier function, printer function, and fax function, and the print operation of each is controlled by the server 2.

Figure 2:
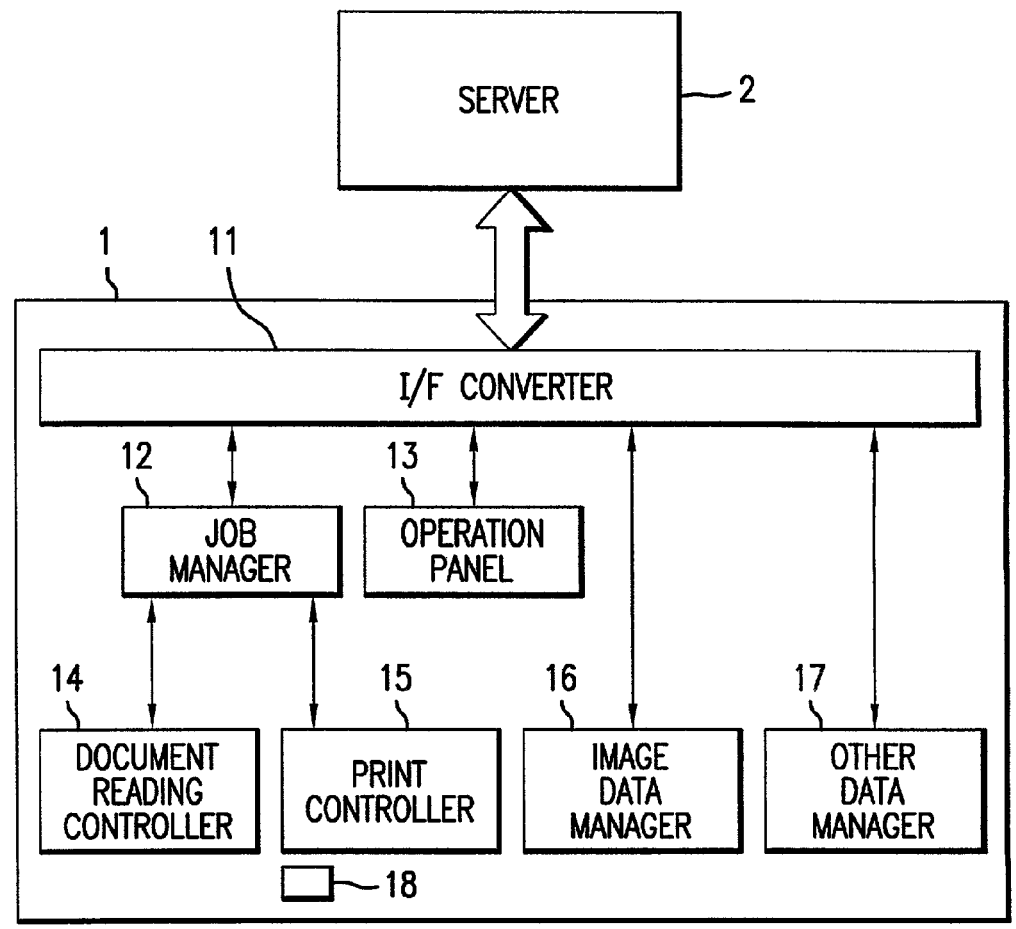
FIG. 2 is a block diagram showing the structure of an image forming apparatus in the same image forming system.

FIG. 2 is a block diagram showing the structure of the printer 1. The basic structures of the printers 1A, 1B, 1C are identical.

In FIG. 2, the printer 1 comprises interface (IF) converter 11, job manager 12, panel 13, document image reading controller 14, print controller 15, image data manager 16, other data manager 17, and sensor 18 for detecting a impaired printing state and the like.

The IF converter 11 is an interface between each printer 1 and the server 2, and performs the role of transferring control signals and image data and the like from the server 2 to each printer 1, and transferring status signals and the like from each printer 1 to the server 2.

The job manager 12 has the function of acquiring and temporarily storing specified job data from the server 2 via the IF converter 11.

The panel 13 has the function of displaying various types of information from the server 2 via the IF converter 11, and can be used to set the various modes and the like.

The document reading controller 14 controls the reading of the image of a document placed on a document table (not shown in the drawing) and converts the read data to image data in accordance with job data managed by the job manager 12.

The print controller 15 controls the printing of acquired image data and image data received from the server 2 in accordance with job data managed by the job manager 12.

The image data manager 16 manages specified image data from the server 2 via the IF converter 11. The other data manager 17 manages various data from the server 2 via the IF converter 11.

The impaired printing state sensor 18 is constructed so as to detect an impaired printing state caused by the generation of an error such as mismatched paper information, paper empty condition and the like.

Figure 3:
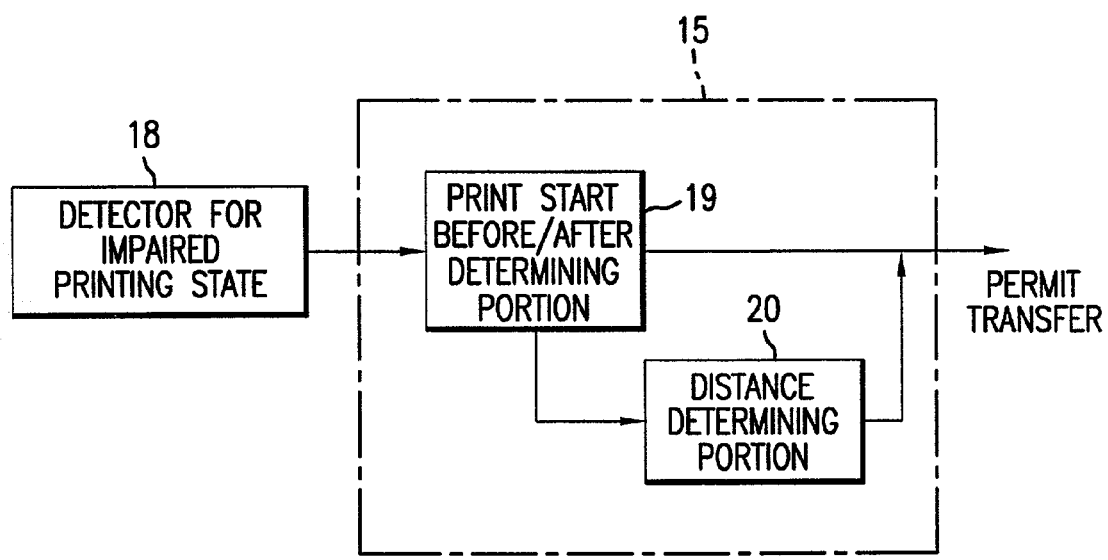
FIG. 3 is a block diagram showing the function structure of the essential part of the print controller in the same image forming apparatus.

FIG. 3 is a block diagram showing the essential structure of the print controller 15.

In FIG. 3, the print controller 15 includes a print start before/after determining portion 19 which functions as both a transfer controller which determines whether or not printing has started, and permits transfer of job data handled by the printer 1 before printing starts, and prohibits transfer after printing starts insofar as specific conditions are not satisfied, and the print controller 15 further includes a distance determining portion 20 which functions as a transfer determining portion for determining a job data transfer permission condition after printing has started. Print controller 15 can also include a notification device for notifying a user when a print job is transfer from the original printer to another printer as well as notify the user how many pages are at each printer when the print job is transferred completely or partially. The notification device can also be locate anywhere in the system from the printers themselves to the server 2.

The distance determining portion 20 determines whether or not a job data transfer destination printer 1 (e.g., printer 1B) is located within a fixed distance from a printer 1 (e.g., printer 1A) in an impaired printing state due to mismatched paper information, paper empty condition or the like.

Figure 4:
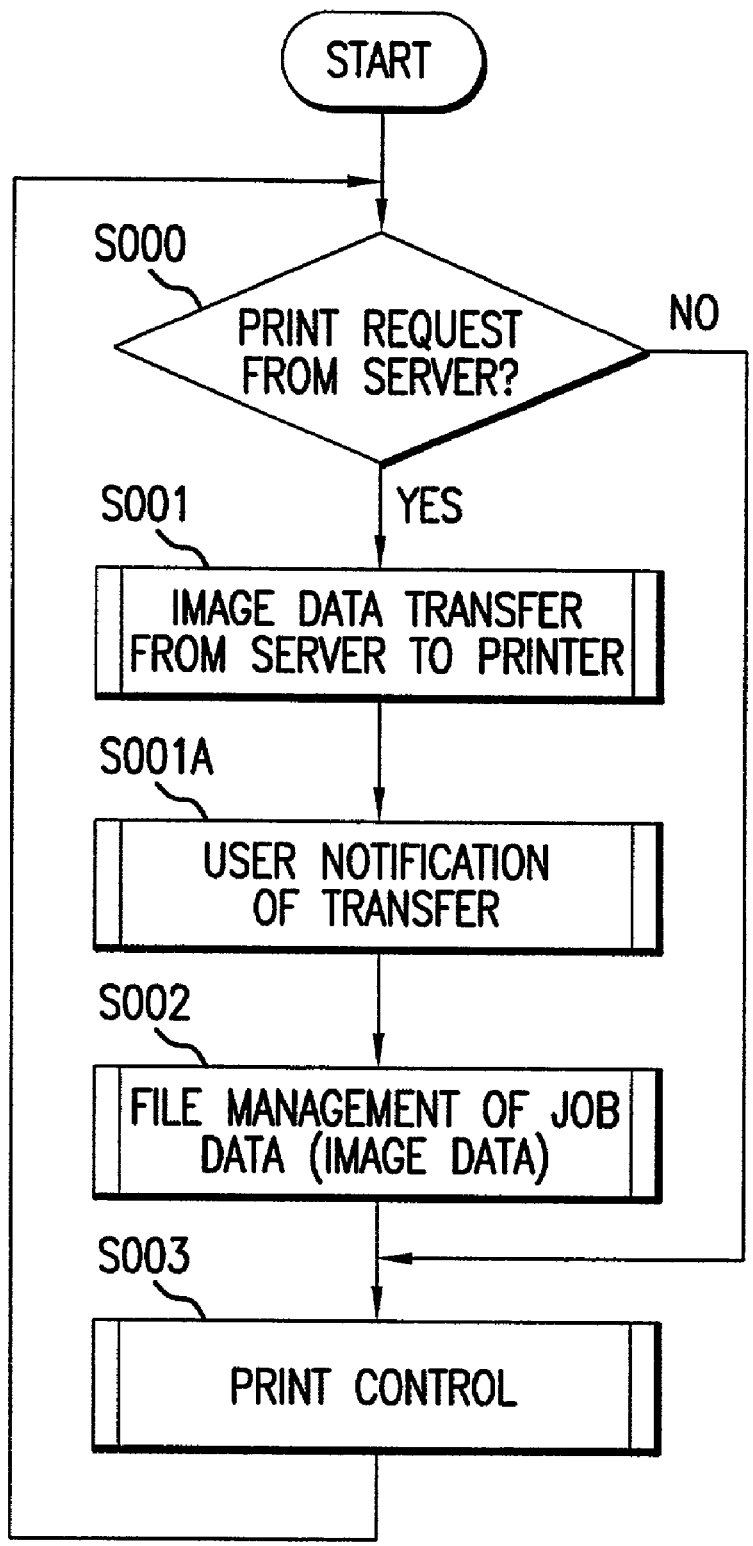
FIG. 4 is a flow chart showing the basic processing flow in the same image forming system.

The flow of the basic processes of the image forming system having the aforesaid construction is described below with reference to the flow chart of FIG. 4. In the following description and in the drawings, the term "step" is abbreviated to the symbol "S".

In S000, the printer determines whether or not a print request has been received from the server 2. If a print request has been received (S000: YES), in S001 image data are transferred from the server 2 to the printer 1. In addition, the process can include a step S001A wherein the user is notified that the print job has been transferred to printer 1 (or to which printer the print job has been transferred). In S002, file management of job data (image data) is executed in the printer 1, and in S003, the print controller 15 controls the processing of the image data in accordance with the specified job. If a print request is not received (S000: NO), the routine enters standby in S003.

Figure 5:
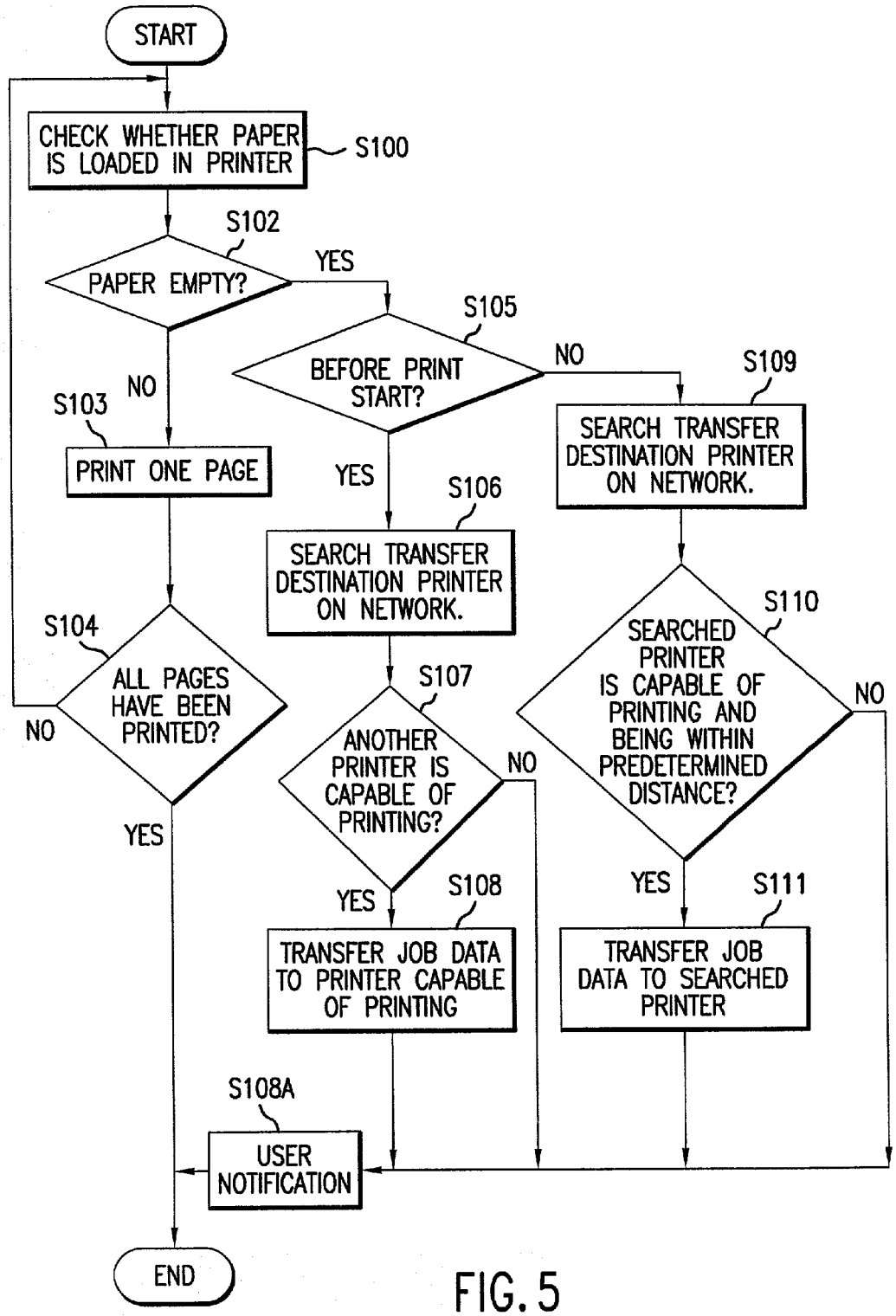
FIG. 5 is a flow chart showing the flow of the job data transfer process executed by the print controller.

The flow of the print control process executed by the print controller 15 is described below with reference to the flow chart in FIG. 5. The operation of the printer 1A is used in the example.

In S100, a check is made to determine whether or not paper is loaded in the printer 1A. In S102, a determination is made as to whether or not paper is missing (paper empty), and if paper is loaded (S102: NO), the printing of a one page (one sheet) is processed in S103 (a notification can also been sent to the user notifying the user that the job is being printed or has started printing at printer 1A), and in S104 a determination is made as to whether or not all pages have been printed, and if print processing of all pages is completed (S104: YES), the routine ends (a notification can also be sent to the user notifying the user that the print job has been completed at printer 1A). If print processing of all pages is not completed (S104: NO), the routine returns to S100 and the processes of S100~S104 are repeated.

If paper is not loaded (S102: NO), then in S105 a determination is made as to whether or not printing has started. If printing has not started (S105: YES), then in S106, job data transfer destination printers 1B and 1C located on the network NW are searched.

In S107, a determination is made as to whether or not another printer 1 is capable of printing. If another printer 1 is capable of printing (S107: YES), then in S108 job data are transferred from the transfer origin printer 1A to another printer capable of printing, e.g., printer 1B. When there is no other printer capable of printing (S107: NO), the process directly ends. The process can also notify the user if the process has ended because of an unavailable printer or if the job has been transferred to another printer and where it was transferred (S108A).

In this way printing is executed without congestion of job data and reduced productivity is avoided because the job data are transferred for printing to another printer 1B capable of printing before printing starts even when an error such as a paper empty condition occurs. Furthermore, since the job data are not dispersed between the transfer origin printer 1A and the transfer destination printer 1B, the task of sorting the output material is unnecessary.

On the other hand, when it is determined that printing has already started (S105: NO), then in S109, job data transfer destination printers are searched on the network NW, and in S110 a determination is made as to whether or not a transfer destination printer capable of printing and matching transfer conditions is located within a fixed distance (i.e., whether or not a distance coefficient corresponding to the distance is less than a specific value) from the transfer origin printer 1A. If a transfer destination printer is located within a fixed distance (S110: YES), then in S111, the job data are transferred to the printer capable of printing (e.g., printer 1B), and the process ends. Then, the transferred remaining image data are printed by the printer 1B. The process can also notify the user that the print job has been transfer, the printer to which it has been transferred, and the number of sheets printed at each printer (S108A).

Since job data can be transferred to an printed by the printer 1B capable of printing if the printer destination printer 1B is located within a fixed distance from the transfer origin printer 1A even after printing has started, the load on the user is slight regardless of the time to go to retrieve the output material at the transfer destination printer 1B compared to when the transfer destination printer 1B is located far away even though the job data are dispersed between the transfer origin printer 1A and the transfer destination printer 1B.

If a transfer destination printer is not located within a fixed distance in S110 (S110: NO), the process directly ends.

Figure 6:
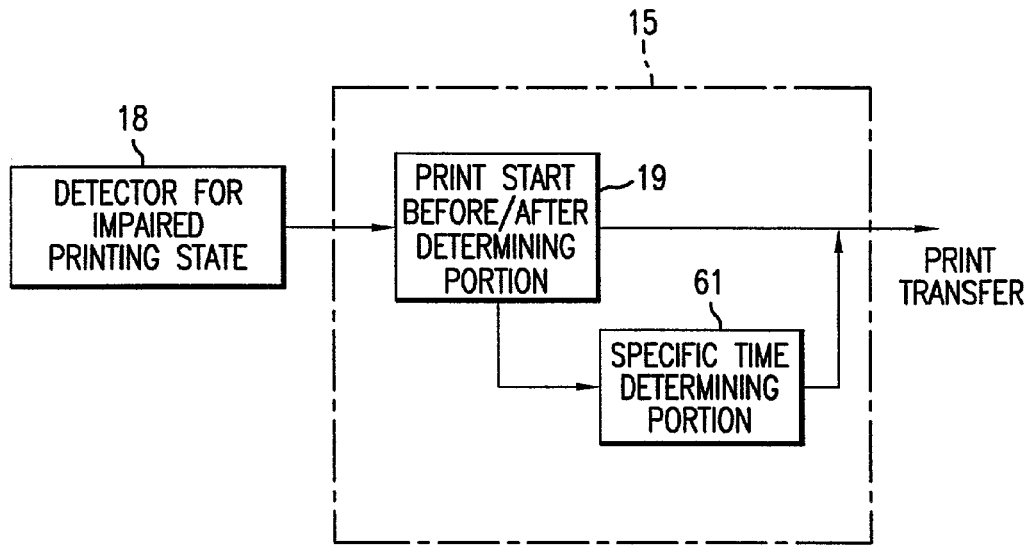
FIG. 6 is a block diagram showing another function structure the essential part of the print controller.

FIG. 6 is a block diagram showing another structure of the print controller 15.

Although, in the previous embodiment, the job data transfer condition after printing has started (S110) is that the transfer destination printer 1 is located within a fixed distance, in the present example, a specific time determining portion 61 is provided for determining whether or not the impaired printing state such as a paper empty condition or the like has continued in excess of the specific time after printing of the job data has started. Then, the print controller 15 transfers the job data to another printer when the specific time determining portion 61 determines that the impaired printing state has continued in excess of the specific time.

That is, there is concern that after printing has started, or if printing has not started even after a specific time has elapsed, print job data may accumulate, and subsequent job data may be sequentially recorded such that a memory overflow occurs so as to prohibit recording of job data and cause processing disruption.

For this reason, it is possible to suitably record subsequent job data and prevent print processing disruption by permitting the transfer of job data after printing has started or when printing has not started after a specific time has elapsed.

Figure 7:
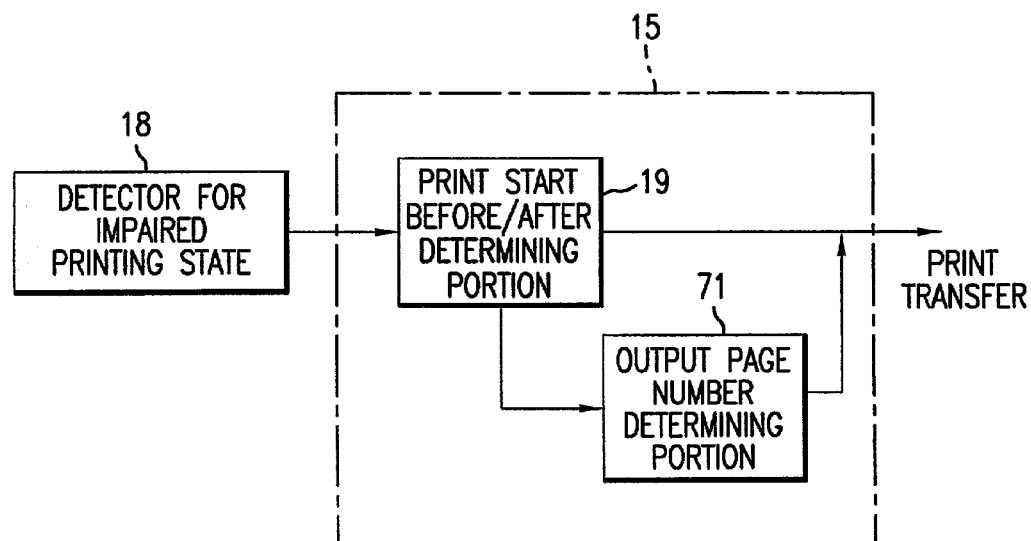
FIG. 7 is a block diagram showing yet another function structure of the essential part of the print controller.

FIG. 7 is a block diagram showing another structure of the print controller 15.

Although, in the embodiment shown in FIG. 3, the job data transfer condition after printing has started (S110 in FIG. 5) is that a transfer destination printer 1B or 1C is located within a fixed distance from the transfer origin printer 1A, the present example provides an output page number determining portion 71 for determining whether or not the number of output pages by image formation has reached a specific value even after image formation of the job data has started. Then, when the output page number determining portion 71 determines that the number of pages output in the printing process has not reached a specific number even after printing of the job data has started, the print controller 15 permits the job data to be transferred to another printer 1, and specifies printing of the job data from the first page of the job data by the transfer destination printer. When the specification is received, the transfer destination printer 1 is set so as to print the job data from the first page of the job data.

Figure 8:
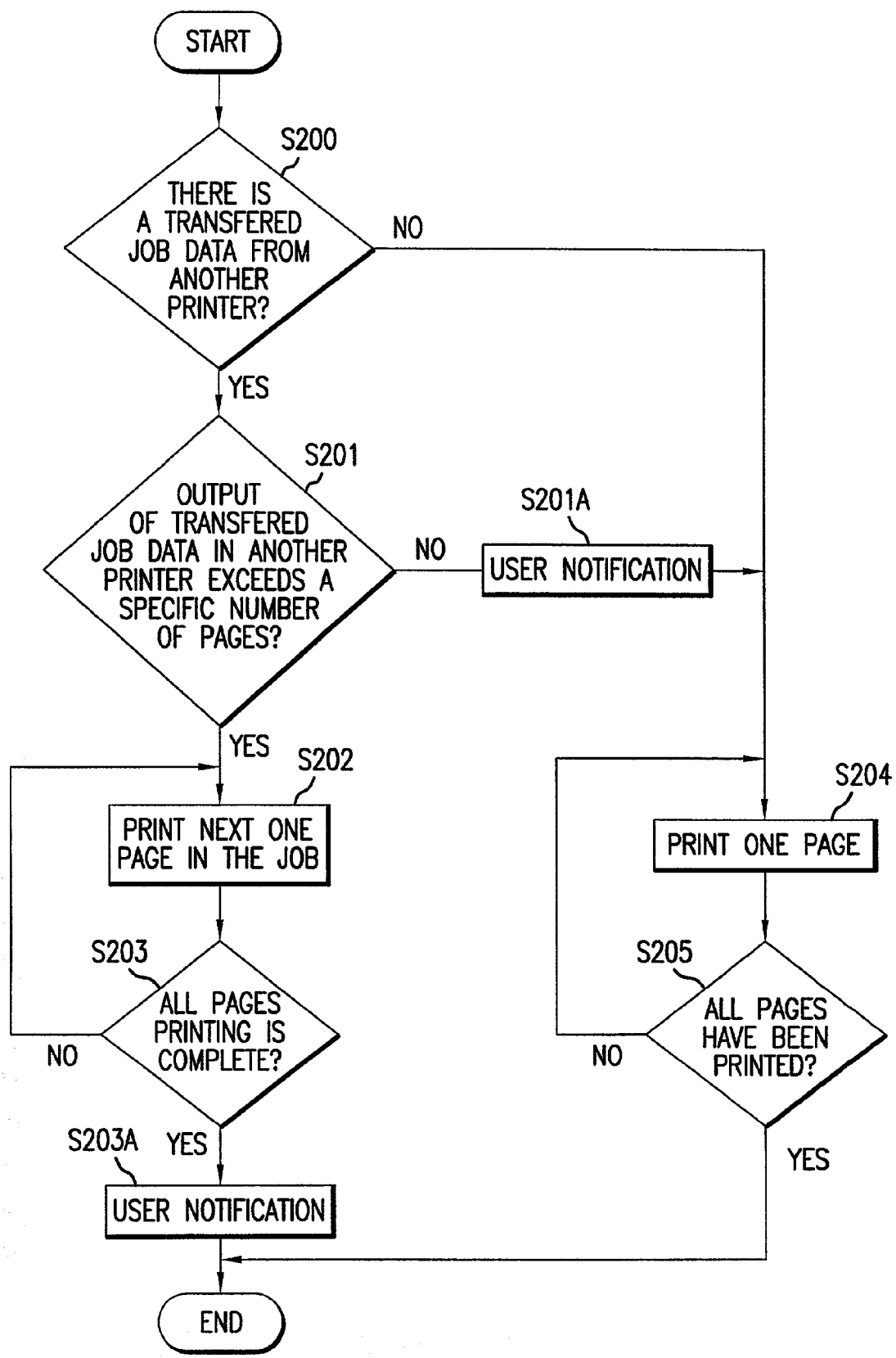
FIG. 8 is a flow chart showing the flow of the processing of job data in the transfer destination image forming apparatus.

The processing flow in the job data transfer destination printer 1, e.g., printer 1B, is described below based on the flow chart of FIG. 8.

First, in S200, a determination is made as to whether or not there is a transfer of job data from another printer 1A or 1C, and if there is a transfer of job data (S200: YES), in S201 a determination is made as to whether or not the print output of the transfer origin printer 1A or 1C already exceeds a specific number of pages.

If the print output already exceeds a specific number of pages (S201: YES), the next one page in the job data is output for printing. Then, in S203, a determination is made as to whether or not all remaining pages have been printed and output is complete. If all output is complete (S203: YES), the routine ends, whereas when all output is not complete (S203: NO), the routine returns to S202, and the printing process continues until all pages are completed. The user can also be notified that the print job has been completed, the printer completing the job, and the printer from which the job was transferred (S203A).

On the other hand, when job data are not transferred from another printer 1A or 1C (S200: NO), and when the print output of the transfer origin printer 1A or 1C does not exceed a specific number of pages (S201: NO), then the printing is executed one by one from the first page in S204. If the job data is transferred from another printer (or even when it is not transferred), the user can also be notified about the status and location of the print output (S201A). In S205, a determination is made as to whether or not all pages have been printed. If output of all page pages is completed (S205: YES), the routine ends, whereas if output of all pages is not complete (S205: NO), the routine enters standby in S204.

The job data are transferred to the printer 1B for processing when, for example, the printer 1A generates an error such as a paper empty condition after three pages have been processed after a print job has started which is equivalent to 50 pages. In this case, the output pages of the transfer origin printer can be ignored, and the complex task of sorting the printed output material is unnecessary since the job data are not dispersed between the transfer origin and the transfer destination.

Although a printer is used as an image forming apparatus in the example of the present embodiment, the present invention is not limited to printers and may be applied to image forming apparatuses such as, for example, digital copiers, facsimile machines and the like.

Although the distance determining portion 20, specific time determining portion 61, and output page number determining portion 71 are individually provided to the respective embodiments, two or more units may be provided simultaneously so as to determine whether or not a plurality of transfer conditions match in the same image forming apparatus.

According to the present invention, the image forming process can be executed without processing congestion by having another image forming apparatus perform the job data image formation. Moreover, the task of sorting the output material is unnecessary because the job data are not dispersed between the transfer origin and the transfer destination.

According to the present invention, a user can easily go to sort the output material, even when the job data are dispersed between the transfer origin image forming apparatus and the transfer destination image forming apparatus, because the transfer destination image forming apparatus is nearby.

According to the present invention, the concern that sequentially received subsequent job data may overflow memory in the impaired image forming state causing disruption in the print processing operation is eliminated.

According to the present invention, even though the number of output pages does not attain a specific value and pages remain in the transfer origin image forming apparatus, the task of sorting output is unnecessary because the job data are output from the first page in the transfer destination image forming apparatus.

According to the present invention, the image formation process can be executed without processing congestion by having another image forming apparatus perform the job data image formation. Moreover, the task of sorting the output material is unnecessary because the job data are not dispersed between the transfer origin and the transfer destination.

According to the present invention, a user can easily go to sort the output material, even when the job data are dispersed between the transfer origin image forming apparatus and the transfer destination image forming apparatus, because the transfer destination image forming apparatus is nearby.

According to the present invention, the concern that subsequently sequentially received job data may overflow in the impaired image forming state causing disruption in the print processing operation is eliminated.

According to the present invention, even though the number of output pages does not attain a specific value and pages remain in the transfer origin image forming apparatus, the task of sorting output is unnecessary because the job data are output from the first page in the transfer destination image forming apparatus.

What is claimed is:

1. An image forming system comprising:
   a plurality of image forming apparatuses connected to a network and capable of mutually transmitting job data; and
   a transfer controller for permitting a transfer of job data to a second image forming apparatus data when an impaired image forming state is detected in a first image forming apparatus processing the job data before an image formation of the job data has started, and for prohibiting the transfer of the job data to the second image forming apparatus even if the second image forming apparatus is capable of printing the job data after the image formation of the job data has started if specific conditions are not satisfied.

2. An image forming system as claimed in claim 1, further comprising:
   a distance determining portion for determining whether the second image forming apparatus is located within a specific distance from the first image forming apparatus; and
   wherein the transfer controller permits the transfer of the job data to the second image forming apparatus when the distance determining portion determines that the second image forming apparatus is located within the specific distance from the first image forming apparatus even after the image formation of the job data has started.

3. An image forming system as claimed in claim 1, further comprising:
   a specific time determining portion for determining whether the impaired image forming state has continued in excess of a specific time after the image formation of the job data has started; and
   wherein the transfer controller permits the transfer of the job data to the second image forming apparatus when the specific time determining portion determines the impaired image forming state has continued in excess of the specific time even after the image formation of the job data has started.

4. An image forming system as claimed in claim 1, further comprising:
   an output page number determining portion for determining whether an output number of pages of the image formation reaches a specific value; and
   wherein the transfer controller permits the transfer of the job data to the second image forming apparatus when the output page number determining portion determines that the output number of pages of the image formation has not reached the specific value even after the image formation of the job data has started, and setting the image formation in the second image forming apparatus to begin from a first page of the job data.

5. An image forming system as claimed in claim 1, wherein the transfer controller notifies a user that the image formation is transferred to the second image forming apparatus.

6. An image forming system as claimed in claim 5, wherein the transfer controller notifies the user that the image formation is being processed on the second image forming apparatus when the image formation is being processed on the first image forming apparatus and the second image forming apparatus.

7. An image forming system as claimed in claim 1, wherein the transfer controller notifies a user that the image formation is being processed on the first image forming apparatus and the second image forming apparatus.

8. An image forming apparatus capable of transmitting job data to another image forming apparatus over a network, the apparatus comprising:
   a transfer controller for permitting a transfer of job data to a second image forming apparatus when an impaired image forming state is detected in a first image forming apparatus processing the job data before an image formation of the job data has started, and for prohibiting the transfer of the job data to the second image forming apparatus after the image formation of the job data has started even if the second image forming apparatus is capable of printing the job data if specific conditions are not satisfied.

9. An image forming apparatus as claimed in claim 8, further comprising:
   a distance determining portion for determining whether the second image forming apparatus is located within a fixed distance; and
   wherein the transfer controller permits the transfer of the job data to the second image forming apparatus when the distance determining portion determines that the second image forming apparatus is located within the fixed distance even after the image formation of the job data has started.

10. An image forming apparatus as claimed in claim 8, further comprising:
    a specific time determining portion for determining whether the impaired image forming state has continued in excess of a specific time after the image formation of the job data has started; and
    wherein the transfer controller permits the transfer of the job data to the second image forming apparatus when the specific time determining portion determines that the impaired image forming state has continued in excess of the specific time even after the image formation of the job data has started.

11. An image forming apparatus as claimed in claim 8, further comprising:
    an output page number determining portion for determining whether an output number of pages of the image formation reaches a specific value; and
    wherein the transfer controller permits the transfer of the job data to the second image forming apparatus when the output page number determining portion determines that the output number of pages of the image formation has not reached the specific value even after the image formation of the job data has started, and setting the image formation in the second image forming apparatus to begin from a first page of the job data.

12. An image forming apparatus as claimed in claim 8, wherein the transfer controller notifies a user that the image formation is transferred to the second image forming apparatus.

13. An image forming apparatus as claimed in claim 12, wherein the transfer controller notifies the user that the image formation is being processed on the second image forming apparatus when the image formation is being processed on the first image forming apparatus and the second image forming apparatus.

14. An image forming apparatus as claimed in claim 8, wherein the transfer controller notifies a user that the image formation is being processed on the first image forming apparatus and the second image forming apparatus.

15. A method of image forming having a network interface sending and receiving print job data, the network interface connecting to a network of image forming apparatuses, the method comprising:
    determining whether a print processing is impaired on a first image forming apparatus relative to the print job data received via the network interface;
    determining whether the print processing of the received job data has started on the first image forming apparatus when the print processing is determined to be impaired;
    transferring the print job data to a second image forming apparatus if the print processing has not started on the first image forming apparatus; and
    determining whether specific conditions are satisfied when it is determined that the print processing has already started on the first image forming apparatus, and transferring the print job data to the second image forming apparatus only when specific conditions are satisfied, even if the second image forming apparatus is capable of printing the job data.

16. A method of image forming as claimed in claim 15, further comprising notifying a user that the print job data is transferred to the second image forming apparatus.

17. A method of image forming as claimed in claim 16, further comprising notifying the user that the image formation is being processed on the second image forming apparatus when the image formation is being processed on the first image forming apparatus and the second image forming apparatus.

18. A method of image forming as claimed in claim 15, further comprising notifying a user that the image formation is being processed on the first image forming apparatus and the second image forming apparatus.

* * * * *